United States Patent
Cho

(10) Patent No.: US 10,002,592 B2
(45) Date of Patent: Jun. 19, 2018

(54) DISPLAYING METHOD OF ELECTRONIC DEVICE USING A COVER AND ELECTRONIC DEVICE THEREOF

(71) Applicant: Samsung Electronics Co., Ltd., Suwon-si, Gyeonggi-do (KR)

(72) Inventor: Dong-Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 14/490,231

(22) Filed: Sep. 18, 2014

(65) Prior Publication Data

US 2015/0278529 A1     Oct. 1, 2015

(30) Foreign Application Priority Data

Mar. 28, 2014   (KR) .................. 10-2014-0036898

(51) Int. Cl.
  *G09G 5/373*   (2006.01)
  *G06F 1/16*    (2006.01)
  *G06F 21/60*   (2013.01)
  *G09G 5/00*    (2006.01)

(52) U.S. Cl.
  CPC ........... *G09G 5/373* (2013.01); *G06F 1/1677* (2013.01); *G09G 5/00* (2013.01); *G06F 2200/1634* (2013.01); *G09G 2340/045* (2013.01); *G09G 2340/0407* (2013.01); *G09G 2340/14* (2013.01); *G09G 2354/00* (2013.01); *G09G 2358/00* (2013.01); *G09G 2360/144* (2013.01)

(58) Field of Classification Search
  CPC ........ G09G 5/32; G09G 3/344; G06F 3/1446; G06F 1/1616; G06F 1/1613; G06F 1/1677; G06F 2203/04803; G06F 3/04886; H04M 1/0241; H04M 1/0245
  USPC ......... 345/1.3, 207, 629, 156, 174; 455/566, 455/556.1
  See application file for complete search history.

(56) References Cited

U.S. PATENT DOCUMENTS

| | | | | |
|---|---|---|---|---|
| 9,645,721 | B2 * | 5/2017 | Horne ................. | G06F 3/04847 |
| 2009/0186660 | A1 * | 7/2009 | Griffin ................. | G06F 1/1616 |
| | | | | 455/566 |
| 2010/0060475 | A1 * | 3/2010 | Choi .................... | G06F 1/1616 |
| | | | | 340/689 |
| 2010/0099458 | A1 * | 4/2010 | Shin .................... | H04M 1/0241 |
| | | | | 455/556.1 |
| 2010/0110010 | A1 * | 5/2010 | Choi .................... | H04M 1/0235 |
| | | | | 345/169 |
| 2011/0065474 | A1 * | 3/2011 | Won .................... | H02J 7/355 |
| | | | | 455/556.1 |
| 2011/0084893 | A1 * | 4/2011 | Lee ...................... | G06F 1/1649 |
| | | | | 345/6 |

(Continued)

FOREIGN PATENT DOCUMENTS

KR    10-2013-0062471 A    6/2013

*Primary Examiner* — Jin-Cheng Wang
(74) *Attorney, Agent, or Firm* — Jefferson IP Law, LLP

(57) ABSTRACT

A displaying method of an electronic device and an electronic device are provided. The electronic device may detect opening or closing of a cover, determine whether the cover is partially opened by measuring the degree of opening of the cover when opening of the cover is detected, and display a partial screen at a specified position in the screen when the degree of opening is determined to be partial opening. In addition, thereto, other embodiments may be included.

12 Claims, 10 Drawing Sheets

(56) References Cited

U.S. PATENT DOCUMENTS

| | | | |
|---|---|---|---|
| 2011/0151938 A1* | 6/2011 | Hashimoto | H04M 1/0245 455/566 |
| 2011/0234557 A1* | 9/2011 | Yang | G09G 3/344 345/207 |
| 2011/0310073 A1* | 12/2011 | Nagata | G06F 3/1423 345/207 |
| 2013/0076614 A1* | 3/2013 | Ive | G06F 1/1677 345/156 |
| 2013/0222323 A1* | 8/2013 | McKenzie | G06F 1/169 345/174 |
| 2013/0328825 A1* | 12/2013 | Brown | G06F 3/01 345/174 |
| 2013/0328914 A1* | 12/2013 | Smith | G06F 3/01 345/619 |
| 2013/0328917 A1* | 12/2013 | Zambetti | G06F 1/1626 345/620 |
| 2014/0009492 A1* | 1/2014 | Fujii | G09G 5/32 345/629 |
| 2014/0043121 A1* | 2/2014 | Sartee | G06F 1/16 335/219 |
| 2014/0128131 A1* | 5/2014 | Sin | H04M 1/185 455/575.8 |
| 2014/0282059 A1* | 9/2014 | Oh | G06F 1/1641 715/744 |
| 2014/0332441 A1* | 11/2014 | Jayetileke | A45C 11/00 206/774 |
| 2015/0026623 A1* | 1/2015 | Horne | G06F 3/04847 715/771 |
| 2015/0049426 A1* | 2/2015 | Smith | A45C 11/00 361/679.27 |
| 2015/0097755 A1* | 4/2015 | Kim | G06F 3/1446 345/1.3 |
| 2015/0286359 A1* | 10/2015 | Oakley | G06F 1/1637 345/173 |
| 2016/0142090 A1* | 5/2016 | Yun | A45C 11/00 455/575.8 |

\* cited by examiner

DISPLAYING METHOD OF ELECTRONIC DEVICE USING A COVER AND ELECTRONIC DEVICE THEREOF

CROSS-REFERENCE TO RELATED APPLICATION(S)

This application claims the benefit under 35 U.S.C. § 119(a) of a Korean patent application filed on Mar. 28, 2014 in the Korean Intellectual Property Office and assigned Ser. No. 10-2014-0036898, the entire disclosure of which is hereby incorporated by reference.

TECHNICAL FIELD

The present disclosure relates to a displaying method in an electronic device and an electronic device thereof.

BACKGROUND

Various kinds of covers are used to prevent electronic devices from being damaged or scratched due to an external impact. Typically, a foldable cover made of two covers that are connected with each other is widely used. One cover of the foldable cover may be opened and closed with respect to a screen of a display of an electronic device, which is referred to as a screen cover. The other cover of the foldable cover may be coupled to an electronic device to replace a back cover thereof, or may have a holder on which an electronic device rests.

Recently, covers, called view covers, have been used. The view cover has a window that is formed on a portion of a screen cover. An electronic device using the view cover may control displaying of a screen according to whether the cover is open or closed. For example, when the cover is opened, the electronic device may display contents on the entire screen area of a display. When the cover is closed, the electronic device may display contents on a partial screen area of the display that corresponds to the window of the cover. Basic information may be displayed in the partial screen area corresponding to the window of the cover. The basic information may include various indicators which show the strength of signals, the capacity of a battery, missed call notification, received message notification, date and time, or the like. For example, a user may recognize reception of a message by the received message notification displayed on the screen through the window of the cover while the cover is closed, and then the user may open the cover and manipulate the electronic device to view the message.

The above information is presented as background information only to assist with an understanding of the present disclosure. No determination has been made, and no assertion is made, as to whether any of the above might be applicable as prior art with regard to the present disclosure.

SUMMARY

When a user of an electronic device opens the cover of the electronic device and views contents displayed on the screen, for example, in public places, the user may wish other people around him or her not to see the contents. In this case, the user may partially open the cover of the electronic device to thereby block people's eyes toward the screen by the cover for viewing the screen by himself or by herself.

However, even though the cover having a window is partially opened, a portion of the screen may be exposed to other people through the window.

Further, in the case of partially opening the cover, a screen area relatively close to a pivot axis of the cover might be covered by the cover, thus causing an inconvenience of the user. This inconvenience may be brought about by a cover not having a window as well as a cover formed with a window.

Aspects of the present disclosure are to address at least the above-mentioned problems and/or disadvantages and to provide at least the advantages described below. Accordingly, an aspect of the present disclosure is to provide a displaying method and an electronic device thereof, which prevent contents displayed on a screen of an electronic device from being exposed to other people when a user is viewing the contents.

Another aspect of the present disclosure is to provide a displaying method and an electronic device thereof, by which a user can easily view contents displayed on a screen of an electronic device while blocking other people's view.

Another aspect of the present disclosure is to provide a displaying method and an electronic device thereof, which display a partial screen at different positions according to closing or partial opening of a cover.

Another aspect of the present disclosure is to provide a displaying method and an electronic device thereof, which change the property of a partial screen to be displayed according to closing or partial opening of a cover.

In accordance with an aspect of the present disclosure, a displaying method of an electronic device is provided. The method includes detecting opening or closing of a cover, determining whether the cover is partially opened by measuring a degree of opening of the cover when opening of the cover is detected, and displaying a partial screen at a specified position in the screen when the degree of opening is determined to be partial opening.

In accordance with another aspect of the present disclosure, an electronic device is provided. The electronic device includes a display configured to include a screen on which a cover is opened or closed, a sensor module configured to detect opening of the cover and to measure the degree of opening of the cover, and a controller configured to display a partial screen at a specified position in the screen when the degree of opening is determined to be partial opening.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
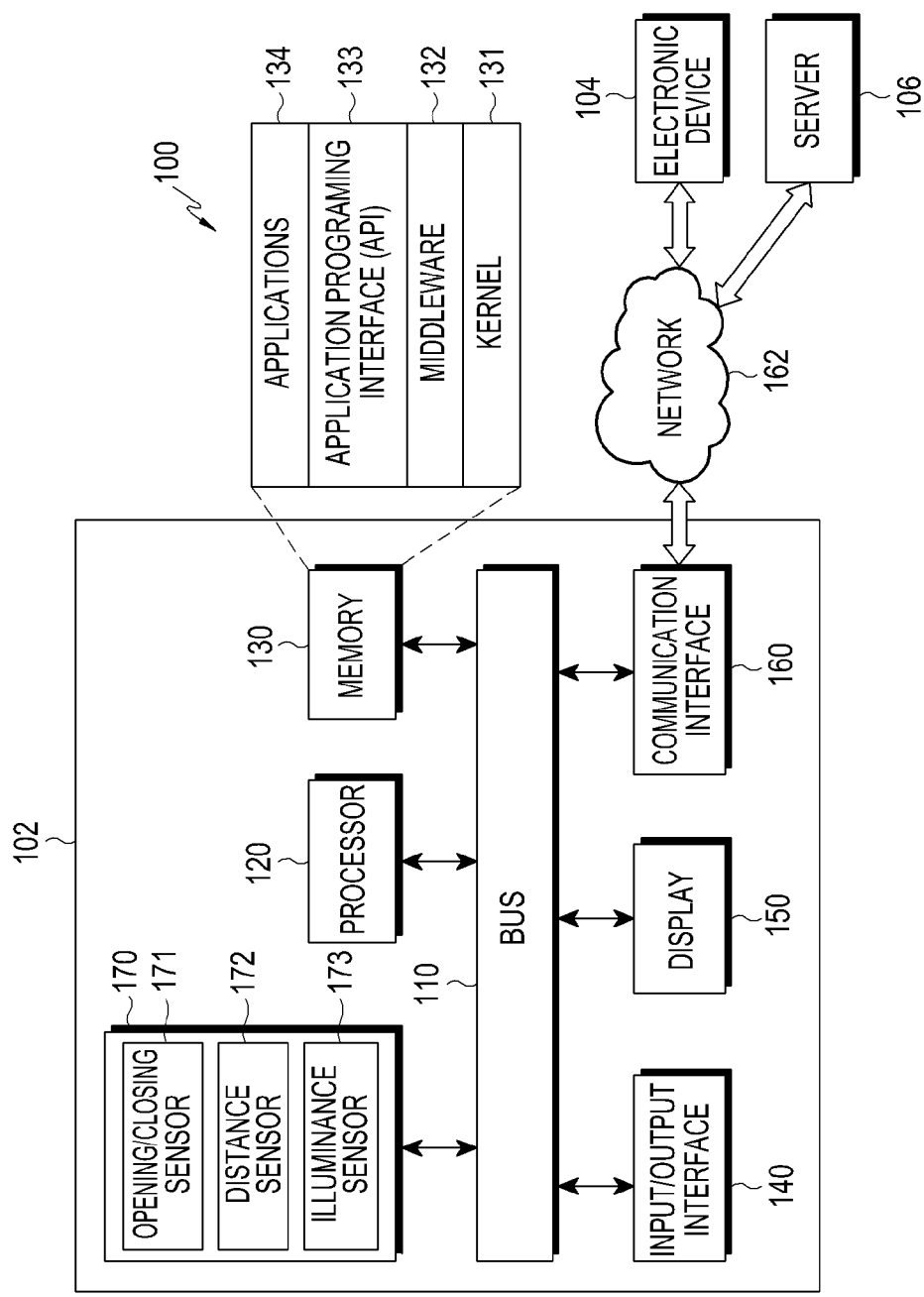
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "1", "2", "first", or "second" used in various embodiments of the present disclosure may modify various components of various embodiments but does not limit the corresponding components. For example, the above expressions do not limit the sequence and/or importance of the elements. The expressions may be used to distinguish a component element from another component element. For example, a first user device and a second user device indicate different user devices although both of them are user devices. For example, without departing from the scope of the present disclosure, a first structural element may be named a second structural element. Similarly, the second structural element also may be named the first structural element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms used in various embodiments of the present disclosure are merely used to exemplify a certain embodiment and should not limit various embodiments or application of the present disclosure. Singular forms are intended to include plural forms unless the context clearly indicates otherwise.

Unless defined differently, all terms used herein, which include technical terminologies or scientific terminologies, have a meaning as would be understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may include at least one of, for example, a smart phone, a tablet Personal Computer (PC), a mobile phone, a video phone, an electronic book reader (e-book reader), a laptop PC, a netbook computer, a Personal Digital Assistant (PDA), a Portable Multimedia Player (PMP), a Moving Picture Experts Group Phase 1 (MPEG-1) audio layer-3 (MP3) player, a mobile medical device, and a camera.

Electronic devices according to various embodiments of the present disclosure may be one or more combinations of the above-described devices. In addition, electronic devices according to various embodiments of the present disclosure may be flexible devices. Further, it is obvious to those skilled in the art that electronic devices according to various embodiments of the present disclosure are not limited to the above-described devices.

FIG. 1 illustrates a network environment including an electronic device according to various embodiments of the present disclosure.

Referring to FIG. 1, in a network environment 100, the electronic device 102 may include a bus 110, a processor 120, a memory 130, an input/output interface 140, a display 150, a communication interface 160, and a sensor module 170. The bus 110 may be a circuit to connect elements of the electronic device 102 with each other and to transfer a communication (e.g., control messages) between the elements.

The processor 120 may receive instructions from other elements (e.g., the memory 130, the input/output interface 140, the display 150, the communication interface 160, the sensor module 170, or the like) through, for example, the bus 110, then decode the received instructions, and perform calculation or data processing according to the decoded instructions.

The memory 130 may store instructions or data received from the processor 120 or other elements (e.g., the input/output interface 140, the display 150, the communication interface 160, the message management module 170, or the like) or generated by the processor 120 or other elements. The memory 130 may include programing modules such as, for example, a kernel 131, a middleware 132, an Application Programing Interface (API) 133, or applications 134. Each of the programing modules may be configured with software, firmware, hardware, or a combination thereof.

The kernel 131 may control or manage system resources (e.g., the bus 110, the processor 120, the memory 130, or the like) which are used in performing operations or functions implemented by other programing modules, for example the middleware 132, the API 133 or the applications 134. Further, the kernel 131 may provide interfaces by which the middleware 132, the API 133 or the applications 134 may access each element of the electronic device 102 for control or management.

The middleware 132 may play an intermediate role between the API 133 or the applications 134 and the kernel 131 to communicate with each other for transmission and reception of data. Further, in relation to requests for operation received from the applications 134, the middleware 132 may control (e.g., scheduling or load-balancing) the requests by, for example, determining priority for using system resources (e.g., the bus 110, the processor 120, the memory 130, or the like) of the electronic device 102 with respect to at least one of the applications 134.

The API 133 is an interface by which the applications 134 controls functions provided from the kernel 131 or the middleware 132, and the API 133 may include, for example, at least one interface or function (e.g., instructions) for file control, window control, image processing, text control, or the like.

According to various embodiments, the applications 134 may include an SMS/MMS application, an e-mail application, a calendar application, an alarm application, a health care application (e.g., an application for measuring the amount of exercise or blood sugar), an environmental information application (e.g., an application for providing atmospheric pressure, humidity, or temperature information), or the like. Additionally or alternatively, the applications 134 may be an application related to the exchange of information between the electronic device 102 and external electronic devices (e.g., an electronic device 104). The information-exchange-related application may include, for example, a notification relay application for relaying specific information to the external electronic devices, or a device management application for managing the external electronic devices. For example, the notification relay application may include a function of transferring notification information generated in other applications (e.g., the SMS/MMS application, the e-mail application, the health care application, the environmental information application, or the like) of the electronic device 102 to an external electronic device (e.g., the electronic device 104). Additionally or alternatively, the notification relay application may receive notification information from an external electronic device (e.g., the electronic device 104) and provide the same to a user. The device management application may manage (e.g., install, delete, update, etc.), for example, at least some functions {e.g., activation or deactivation of an external electronic device (or some elements thereof), or adjusting the brightness (or resolution) of a display} of an external electronic device (e.g., the electronic device 104) that communicates with the electronic device 102, applications performed in an external electronic device, or services (e.g., a phone call service, or a messaging service) provided in an external electronic device.

According to various embodiments, the applications 134 may include applications, which are designated according to the property (e.g., the type of electronic device) of an external electronic device (e.g., the electronic device 104). For example, if the external electronic device is an MP3 player, the applications 134 may include applications related to reproduction of music. Likewise, if the external electronic device is a mobile medical device, the applications 134 may include an application related to health care. According to an embodiment, the applications 134 may include at least one of applications designated in the electronic device 102 or applications received from external electronic devices (e.g., a server 106, or the electronic device 104).

The input/output interface 140 may transfer instructions or data input by a user through input/output devices (e.g., sensors, keyboards, or touch screens) to the processor 120, the memory 130, the communication interface 160, or the sensor module 170 through, for example, the bus 110. For example, the input/output interface 140 may provide data on a user's touch input through a touch screen to the processor 120. For example, the input/output interface 140 may allow instructions or data received from the processor 120, the memory 130, the communication interface 160, or the sensor module 170 through the bus 110 to be output through the input/output devices (e.g., speakers or displays).

The display 150 may display various pieces of information (e.g., multimedia data, text data, etc.) to a user. A screen of the display 150 may be covered or uncovered by a cover adopted in the electronic device 102. The cover may or may not have a window formed on a portion thereof. The cover may be opened or closed with respect to a screen of the display 150.

The communication interface 160 may perform communication connection between the electronic device 102 and external electronic devices (e.g., the electronic device 104, or the server 106). For example, the communication interface 160 may be connected with a network 162 through wireless communication or wired communication to thereby communicate with the external electronic devices. The wireless communication may include at least one scheme of Wi-Fi, Bluetooth (BT), Near Field Communication (NFC), a Global Positioning System (GPS), or cellular communication {e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), or Global System for Mobile Communications (GSM)}. The wired communication may include at least one of a Universal Serial Bus (USB), a High Definition Multimedia Interface (HDMI), Recommended Standard 232 (RS-232), or a Plain Old Telephone Service (POTS).

According to an embodiment, the network 162 may be a telecommunication network. The communication network may include at least one of a computer network, the Internet, the Internet of things, or a telephone network. According to an embodiment, protocols (e.g., a transport layer protocol, a data link layer protocol, a physical layer protocol, etc.) for communication between the electronic device 102 and external electronic devices may be provided by at least one of the applications 134, the API 133, the middleware 132, the kernel 131, or the communication interface 160.

The sensor module 170 may include an opening/closing sensor 171, a distance sensor 172, and an illuminance sensor 173. The opening/closing sensor 171 may detect the opening and closing of a cover with respect to a screen of the display 150. For example, a magnet may be installed in the cover, and a magnetic sensor such as hall sensor may be used as the opening/closing sensor 171. The magnet and the magnetic sensor may be installed to face each other so that the magnetic sensor may detect magnetism with the cover closed. In a case in which a magnet is installed in the cover and a magnetic sensor as the opening/closing sensor 171 is installed in the electronic device 102, when the cover is closed, the magnetic sensor may detect magnetism, and when the cover is opened, the magnetic sensor may not detect magnetism.

The distance sensor 172 may be a sensor that can measure a distance, such as an infrared sensor, an ultrasonic sensor, a proximity sensor, and the like. The distance sensor 172 may be installed on the same plane as the screen of the display 150 in the electronic device 102. The distance sensor 172 may measure a distance between a surface of the cover that is facing the screen of the display 150 and that is opened or closed on the screen of the display 150, and the screen of the display 150. The distance sensor 172 may be installed at the position where a distance between the distance sensor 172 and the facing surface of the cover can be measured when the degree of opening of the cover is in a specified range of partial opening.

The illuminance sensor 173 may measure the illuminance around the electronic device 102.

According to an embodiment of the present disclosure, a controller may include the processor 120, and the memory 130 for storing information required by the processor 120. The controller may a Central Processing Unit (CPU), may control overall operations of the electronic device 102, and may operate according to a displaying method in accordance with embodiments of the present disclosure.

According to an embodiment of the present disclosure, the controller may detect opening and closing of a cover through the opening/closing sensor 171 or the distance sensor 172. In an embodiment of the present disclosure, in the case of using a cover having a window formed on a portion thereof, when the cover is closed, the controller may display contents in a partial screen area of the display 150, which corresponds to the window of the cover. The partial screen area corresponding to the window of the cover may be the screen area that is exposed through the window in the entire screen area of the display 150 when the cover is closed.

According to an embodiment of the present disclosure, when the opening/closing sensor 171 or the distance sensor 172 detects opening of a cover, the controller may measure the degree of opening of the cover by means of the distance sensor 172. The controller may regard a distance measured by the distance sensor 172 as the degree of opening of the cover. The controller may determine whether the cover is partially opened by the degree of opening of the cover measured by the distance sensor 172. The controller may determine whether the degree of opening of the cover is in a specified range of partial opening. If the degree of opening of the cover is in a specified range of partial opening, the controller may determine that the cover is partially opened.

According to an embodiment of the present disclosure, the controller may detect opening and closing of a cover by the distance sensor 172, and measure the degree of opening of the cover when the cover is detected to be open. In another embodiment of the present disclosure, the controller may not operate the distance sensor 172 while closing of the cover is being detected by the opening/closing sensor 171. The controller may operate the distance sensor 172 after opening of the cover is detected by the opening/closing sensor 171 to thereby measure the degree of opening of the cover by the distance sensor 172. If the distance sensor 172 is not operated while the cover is closed, and the distance sensor 172 is operated while the cover is opened, power consumption due to the operation of the distance sensor 172 may be reduced because the distance sensor 172 is not operated while the cover is closed.

According to an embodiment of the present disclosure, when it is determined that the cover is partially opened, the controller may display a partial screen at a specified position of a screen of the display 150. In a case of using a cover having a window, the specified position may be designated in a second screen area other than a first screen area that corresponds to the window formed in a portion of the cover in the whole screen area of the display 150. The first screen area may be a screen area that is exposed through a window of a cover in the whole screen area of the display 150 when the cover is closed. In using a cover having a window, when the cover is partially opened in a closed state, the controller may stop displaying the partial screen in the first screen area on the screen of the display 150, and may display another partial screen in the second screen area on the screen of the display 150.

According to an embodiment of the present disclosure, the partial screen may be a portion of the entire screen area of the display 150. The property of a partial screen may be changed. The property of a partial screen may include the size of a partial screen, the color of a partial screen, a contents configuration in a partial screen, the sequence of contents in a partial screen, or the like.

According to an embodiment of the present disclosure, when a cover is partially opened, the controller may change the property of a partial screen according to the degree of opening. According to another embodiment of the present disclosure, the controller may change the property of a partial screen according to a user input. When a size among the property of a partial screen is changed, contents to be displayed in the partial screen may be changed to conform to the changed size.

According to an embodiment of the present disclosure, the controller may change a configuration of contents to be displayed on a partial screen according to the degree of opening of a cover. For example, when the contents to be displayed on a partial screen include images and texts, the controller may remove images from the contents and display the image-removed contents on the partial screen. According to another embodiment of the present disclosure, the controller may measure the illuminance around the electronic device 102 by using the illuminance sensor 173. If the illuminance around the electronic device is less than a reference value, and the contents to be displayed on a partial screen include images and texts, the controller may remove images from the contents and display the image-removed contents on the partial screen. The reference value may be set automatically or manually according to embodiments.

An electronic device according to various embodiments of the present disclosure may include a display including a screen on which a cover is opened or closed, a sensor module that detects opening of a cover and measures the degree of opening of the cover, and a controller that displays a partial screen at a specified position of the screen when the opening of the cover is determined to be partial opening. If the degree of opening is in a specified range of partial opening, the controller may determine that the cover is partially opened. The cover may include a window formed in a portion of the cover, and the specified position may be designated in a second screen area other than a first screen area that corresponds to the window in the whole screen area of the display. When the cover is closed, the controller may display a partial screen in the first screen area, and when the cover is partially opened from a closed state, the controller may stop displaying the partial screen in the first screen area. The controller may change the property of the partial screen displayed at a specified position according to the degree of opening. The controller may change the size of the partial screen in the direction of a pivot axis of a cover. The sensor module may include a distance sensor for measuring a distance between the facing surface of the cover and the screen, and the controller may regard a distance measured by the distance sensor as the degree of opening. The sensor module may further include an opening/closing sensor for detecting opening and closing of the cover, and the controller may operate the distance sensor while opening of the cover is being detected by the opening/closing sensor. When the contents to be displayed on a partial screen include images and texts, the controller may remove images from the contents and display the image-removed contents on the partial screen. The sensor module may include an illuminance sensor that measures the illuminance around the electronic device. If the illuminance around the electronic device, which is measured by the illuminance sensor, is less than a reference value, and the contents to be displayed on the partial screen include images and texts, the controller may remove images from the contents and display the image-removed contents on the partial screen.

Figure 2A:
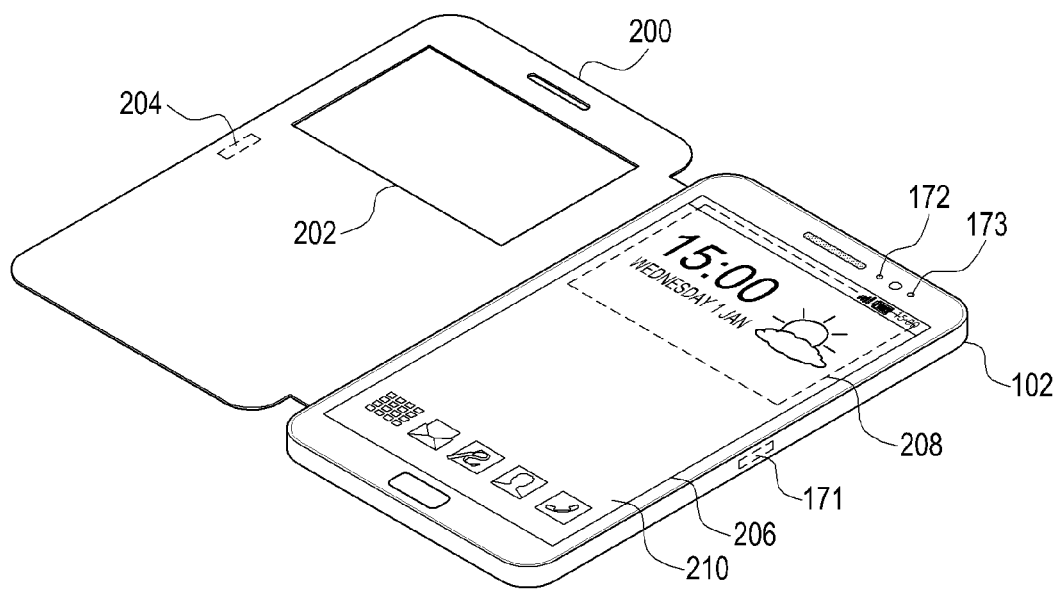
FIGS. 2A, 2B, and 2C illustrate examples of displaying according to opening and closing of a cover according to an embodiment of the present disclosure.
Figure 2B:
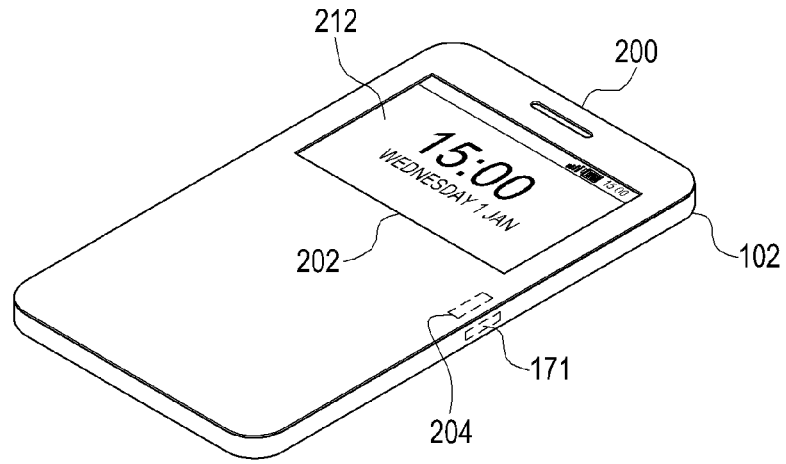
Figure 2C:
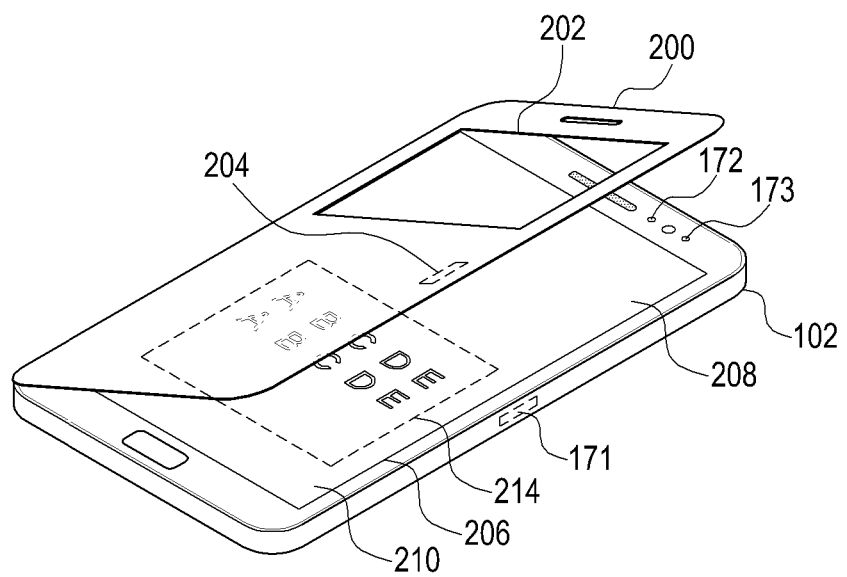

FIGS. 2A to 2C illustrate examples of displaying according to opening and closing of a cover according to an embodiment of the present disclosure. FIGS. 2A to 2C refer to an electronic device 102 that adopts a cover 200 having a window 202 formed on a portion of the cover 200.

Referring to FIG. 2A, the cover 200 of the electronic device 102 is illustrated in an opened state. The electronic device 102 is provided with an opening/closing sensor 171, a distance sensor 172, and an illuminance sensor 173. In the illustrated example, the opening/closing sensor 171 detects opening and closing of the cover 200. For example, a magnet 204 may be installed in the cover 200, and a magnetic sensor may be used as the opening/closing sensor 171. In this case, the electronic device 102 may detect the magnet 204 of the cover 200 by using the opening/closing sensor 171. The electronic device 102 may recognize opening or closing of the cover according to the detection of the magnet 204. The electronic device 102 may include a screen 206 that includes a first screen area 208, corresponding to the window 202 of the cover 200, and a second screen area 210.

Referring to FIG. 2B, the cover 200 of the electronic device 102 is illustrated in a closed state. The magnet 204 and the opening/closing sensor 171 may be installed to correspond to each other so that the magnet 204 of the cover 200 may be detected by the opening/closing sensor 171 when the cover 200 is closed with respect to a screen 206 of a display 150. When the cover 200 is closed, the electronic device 102 may display a partial screen 212 in the first screen area 208 corresponding to the window 202 of the cover 200.

When the magnet 204 of the cover 200 is detected by the opening/closing sensor 171, the electronic device 102 may determine that the cover 200 is closed. When magnet 204 of the cover 200 is not detected by the opening/closing sensor 171, the electronic device 102 may determine that the cover 200 is opened.

The distance sensor 172 may be installed in the electronic device 102 as shown in FIG. 2A. The electronic device 102 may recognize opening and closing of the cover 200 according to whether a distance measured by the distance sensor 172 is more or less than a reference value. If the distance measured by the distance sensor 172 is less than the reference value, the electronic device 102 may determine that the cover 200 is closed. If the distance measured by the distance sensor 172 is not less than the reference value, the electronic device 102 may determine that the cover 200 is open.

When the cover 200 is opened, the electronic device 102 may measure the degree of opening of the cover 200 by the distance sensor 172. The electronic device 102 may regard a distance measure by the distance sensor 172 as the degree of opening of the cover 200.

Referring to FIG. 2C, the cover 200 of the electronic device 102 is illustrated in a partially opened state.

When the cover 200 is opened as shown in FIG. 2C, the electronic device 102 may determine whether the degree of opening of the cover 200, which is measured by the distance sensor 172, is in a specified range of partial opening to thereby determine partial opening of the cover 200. When the cover 200 is partially opened, the electronic device 102 may stop displaying the partial screen 212 in the first screen area 208 and may display another partial screen 214 in the second screen area 210.

Figure 3:
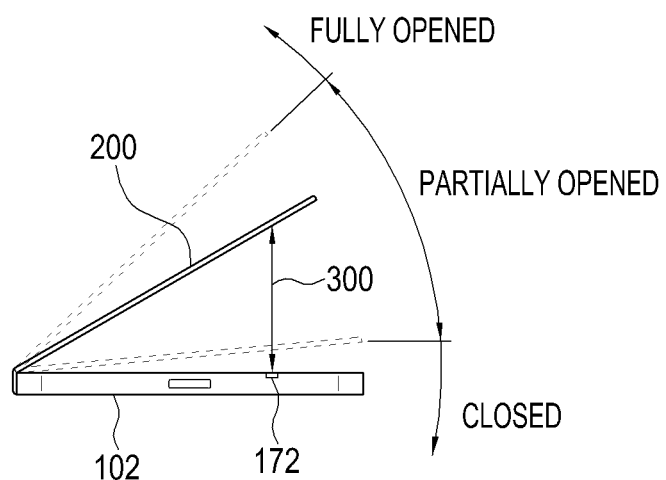
FIG. 3 illustrates an example of partial opening of a cover according to an embodiment of the present disclosure.

FIG. 3 illustrates an example of partial opening of a cover according to an embodiment of the present disclosure.

Referring to FIG. 3, when the cover 200 is opened, the electronic device 102 may determine whether the distance 300 measured by the distance sensor 172 is in the range of partial opening to thereby determine partial opening of the cover 200. The range of partial opening may be specified by considering the installation location of the distance sensor 172 and the degree of covering the screen 206 when the cover 200 is opened. The range of partial opening may be set automatically or manually according to the various embodiments. For example, the range of a distance measured by the distance sensor 172 when the cover 200 is opened at angles between 30 and 60 degrees may be defined as the range of partial opening. When a measured distance 300 exceeds the range of partial opening, the electronic device 102 may determine that the cover 200 is fully opened. The case in which the measured distance 300 exceeds the range of partial opening may include a case in which the distance sensor 172 cannot measure a distance because the cover 200 is fully opened. If the measured distance 300 is less than the range of partial opening, the electronic device 102 may determine that the cover 200 is closed.

Figure 4:
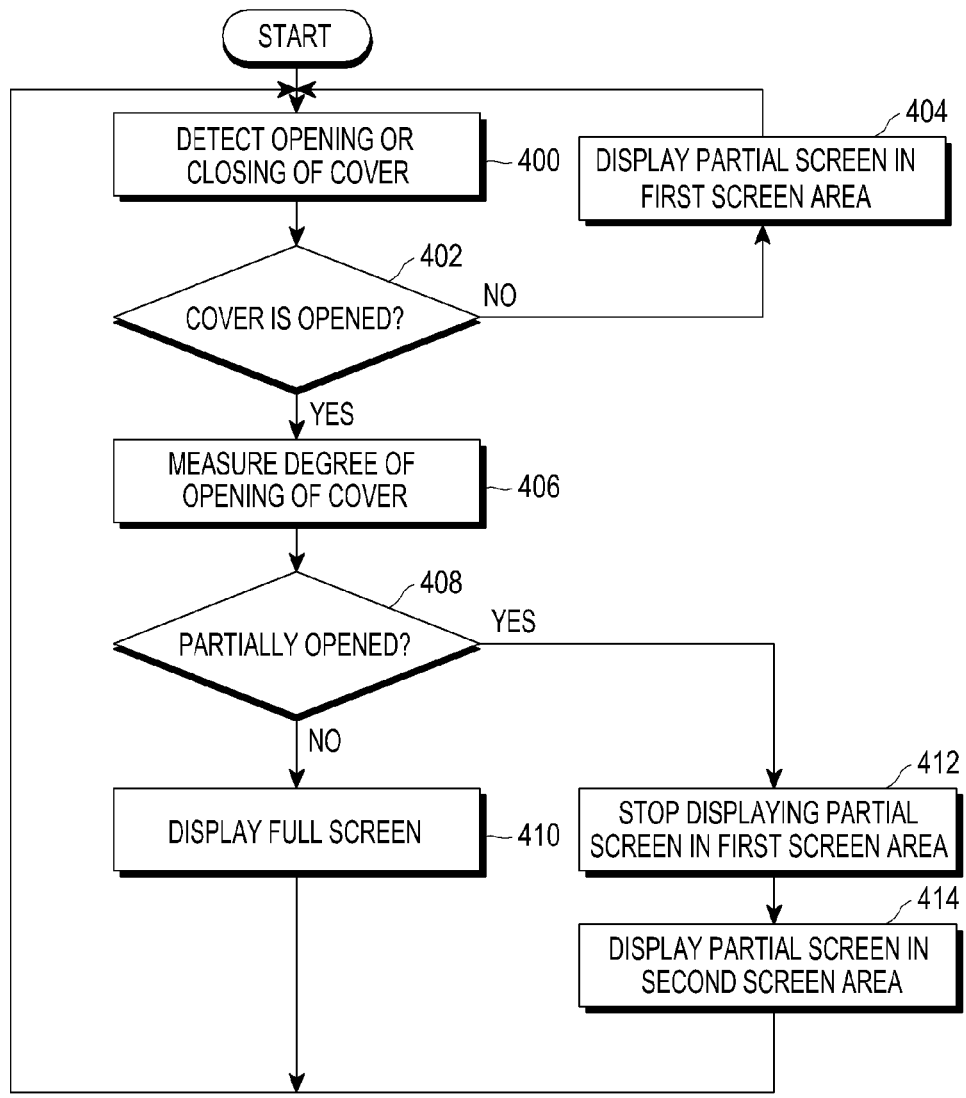
FIG. 4 is a flowchart of displaying according to an embodiment of the present disclosure.

FIG. 4 is a flowchart of displaying according to an embodiment of the present disclosure. FIG. 4 refers to an electronic device 102 that adopts a cover 200 having a window 202 formed therein. Operations of FIG. 4 may be executed by, for example, the controller of the electronic device 102.

Referring to FIG. 4, the electronic device 102 may detect opening or closing of the cover 200 by means of the opening/closing sensor 171 in operation 400, to thereby determine whether the cover 200 is opened in operation 402. When the cover 200 is closed, the electronic device 102 may display a partial screen 212 in the first screen area 208 corresponding to the window 202 of the cover 200 in the screen 206 of FIG. 2A, as shown in FIG. 2B in operation 404. Basic information may be displayed on the partial screen 212. The basic information may include various indicators which show the strength of one or more signals, the status of a battery, a missed call notification, a received message notification, the current date and time, or the like. For example, a user may recognize reception of a message by the received message notification displayed on the partial screen 212 through the window 202 of the cover 200 while the cover 200 is closed, and then the user may open the cover 200 and manipulate the electronic device 102 to thereby view the message. The electronic device 102 may repeat operation 400 after operation 404.

When the cover 200 is opened, the electronic device 102 may operate and allow the distance sensor 172 to measure the degree of opening of the cover 200 in operation 406. The electronic device 102 may determine whether the degree of opening is in the range of partial opening to thereby determine whether the cover 200 is partially opened in operation 408.

When the cover 200 is fully opened, the electronic device 102 may display a full screen by which contents may be displayed on the entire screen 206 of the display 150 as shown in FIG. 2A in operation 410. After operation 410, the electronic device 102 may repeat operation 400.

When the cover 200 is partially opened, the electronic device 102 may stop displaying the partial screen 212 in the first screen area 208 while the cover 200 is closed in operation 412, and may display another partial screen 214 in the second screen area 210 as shown in FIG. 2C in operation 414.

In an embodiment, the first screen area 208 may be the area that corresponds to the window 202 of the cover 200 in the screen 206 of the display 150, and the second screen area 210 may be the remaining area except for the first area 208. The electronic device 102 may display the partial screen 214 at a specified position of the second screen area 210. In addition, the partial screen 214 may be displayed at a position in the second screen area 210 where a user can easily view the contents displayed on the partial screen 214. For example, the partial screen may be displayed in an area relatively far from the pivot axis of the cover 200 in the second area 210. The position of the partial screen 214 may be specified automatically or manually.

Accordingly, a user can easily block the partial screen 214 with a portion of the cover 200 where the window 202 is not formed while he or she is viewing the partial screen 214 by partially opening the cover 200. Therefore, the contents displayed on the partial screen 214 may be prevented from being exposed to other people by the partially opened cover 200, while a user can easily view the contents of the partial screen 214.

Figure 5:
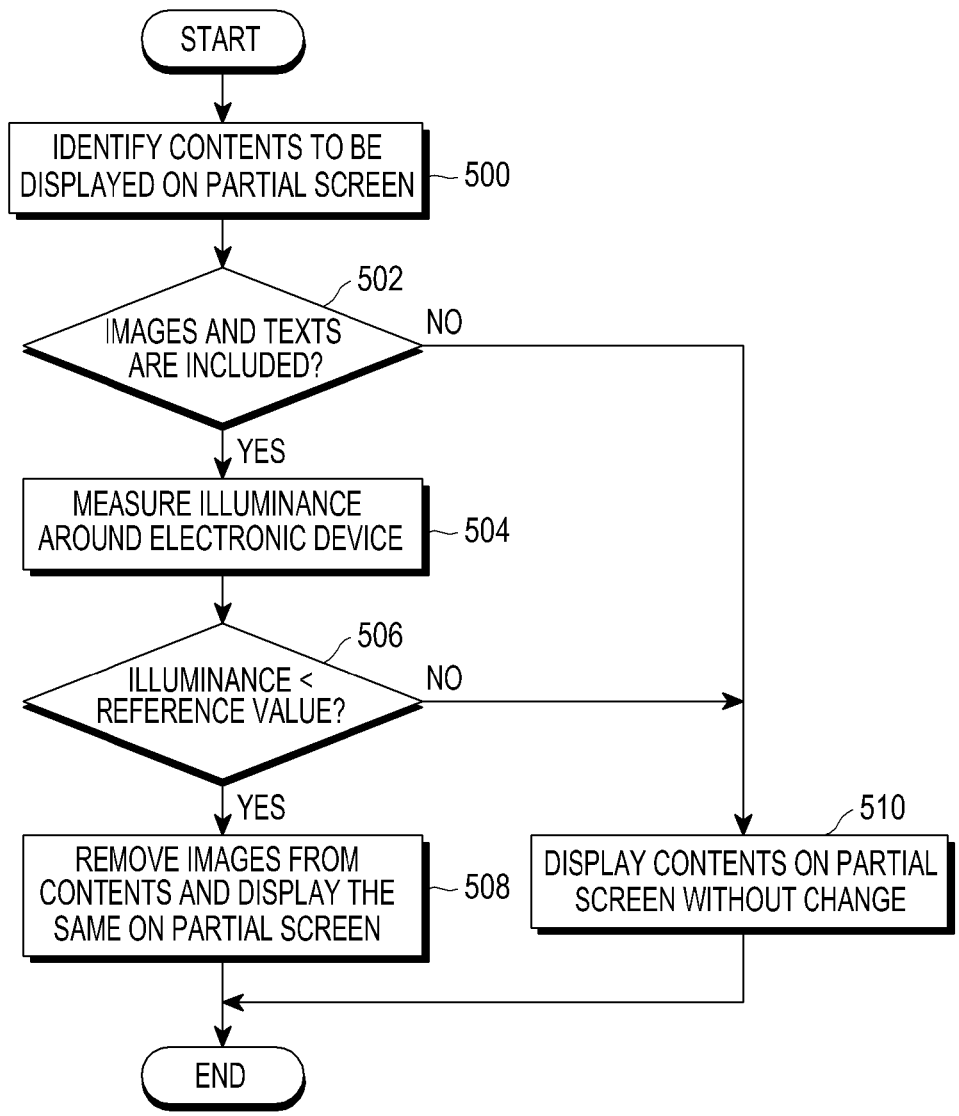
FIG. 5 is a flowchart of displaying a partial screen according to an embodiment of the present disclosure.

FIG. 5 is a flowchart of displaying a partial screen according to an embodiment of the present disclosure. Operations of FIG. 5 may be executed in operation 414 of FIG. 4 by, for example, the controller of the electronic device 102.

Referring to FIG. 5, the electronic device 102 may identify contents to be displayed in the partial screen 214 in operation 500, and the electronic device 102 may determine whether the contents include images and texts in operation 502. If the contents do not include images and texts, the electronic device 102 may display the partial screen 214 without a change of the contents in operation 510.

If the contents include images and texts, the electronic device 102 may measure the illuminance around the electronic device 102 by the illuminance sensor 173 in operation 504 to determine whether the measured illuminance is less than a reference value in operation 506. If the measured illuminance is less than a reference value, the electronic device 102 may remove the images from the contents and display the image-removed contents on the partial screen 214 in operation 508.

Since the partial screen 214 is smaller than the full screen 206, when a user views the partial screen 214 in a dark place with the cover 200 partially opened, the readability of contents on the partial screen 214 may be degraded. If the contents displayed on the partial screen 214 include images and texts, the texts may be displayed smaller due to the images which occupy the partial screen 214. However, when the electronic device 102 is used in a dark place where the illuminance around the electronic device 102 is less than a reference value, if the contents are displayed with the images removed, the texts may be displayed bigger as compared to the contents including the images.

Accordingly, a configuration of contents to be displayed on the partial screen 214 is changed according to the degree of opening of the cover 200, so the readability of contents displayed on the partial screen 214 may be enhanced.

Figure 6:
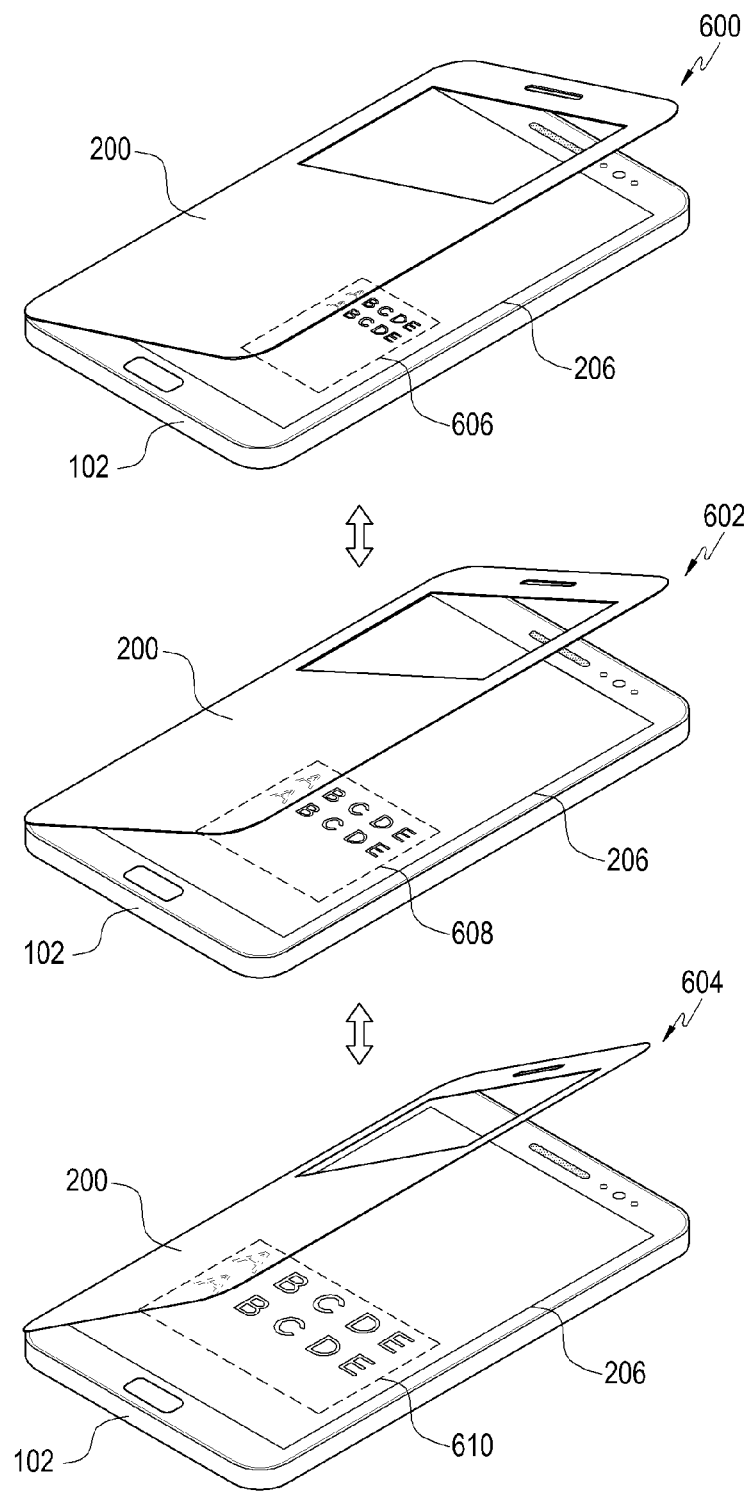
FIG. 6 illustrates an example of changing the size of a partial screen according to an embodiment of the present disclosure.

FIG. 6 illustrates an example of changing the size of a partial screen according to an embodiment of the present disclosure. FIG. 6 shows an electronic device 102 adopting a cover 200 formed with a window 202, wherein the size among the property of a partial screen is changed according to the degree of opening of the cover 200. In addition, FIG. 6 illustrates three examples 600, 602 and 604 in which the size of the partial screen is changed according to the degree of opening of the cover 200.

The partial screens 606, 608 and 610 of three examples 600, 602 and 604 in FIG. 6 may be changed in sizes according to the degree of opening of the cover 200. The electronic device 102 may change the size of the partial screen according to the degree of opening of the cover 200. As the degree of opening gradually increases from the example 600, to the example 602, then to the example 604, the electronic device 102 may change the size of the partial screen to gradually increase from the small partial screen 606, to the medium partial screen 608, then to the big partial screen 610. As an example and as illustrated in FIG. 6, the size of the partial screen is increased by means of increasing a width of the screen while the length of the screen stays substantially the same. Also, as the size of the partial screen is increased, a size of texts displayed on the partial screen is increased. In another example, the length of the partial screen may be increased while the width remains the same. In another example, both the width and the length of the partial screen may be increased. In another example, the size of the text may increase while the length and width of the partial screen remains the same. As the degree of opening gradually decreases from the example 604, to the example 602, then to the example 600, the electronic device 102 may change the size of the partial screen to gradually decrease from the big partial screen 610, to the medium partial screen 608, then to the small partial screen 606. The partial screens 606, 608 and 610 may be enlarged or contracted in the direction of the pivot axis of the cover 200.

Figure 7:
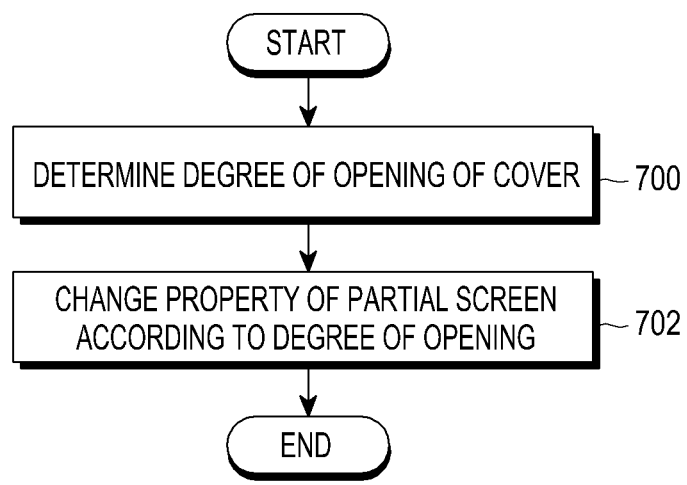
FIG. 7 is a flowchart of changing the property of a partial screen according to an embodiment of the present disclosure.

FIG. 7 is a flowchart of changing the property of a partial screen according to an embodiment of the present disclosure. Operations of FIG. 7 may be executed in operation 414 of FIG. 4 by, for example, the controller of the electronic device 102.

Referring to FIG. 7, the electronic device 102 may determine the degree of opening of the cover 200 measured by the distance sensor 172 in operation 700, and change the property of a partial screen according to the degree of opening of the cover 200 in operation 702. The electronic device 102 that changes the property of a partial screen in operation 702, for example, may change the size of the partial screen according to the degree of opening of the cover 200 as shown in FIG. 6.

Accordingly, a partial screen may be displayed in a big size as far as possible in the area where a user may easily view the partial screen, other than the area close to the pivot axis of the cover 200 where it is hard for a user to view the partial screen, according to the degree of opening of the cover 200, so that a user may easily view the contents displayed on the partial screen.

According to another embodiment of the present disclosure, the size of the partial screen may be changed by a user, for example, as the sizes of the partial screens 606, 608 and

610. For example, a user may touch the partial screens 606, 608 and 610 on the screen 206 to thereby enlarge or contract the partial screens 606, 608 and 610.

Figure 8:
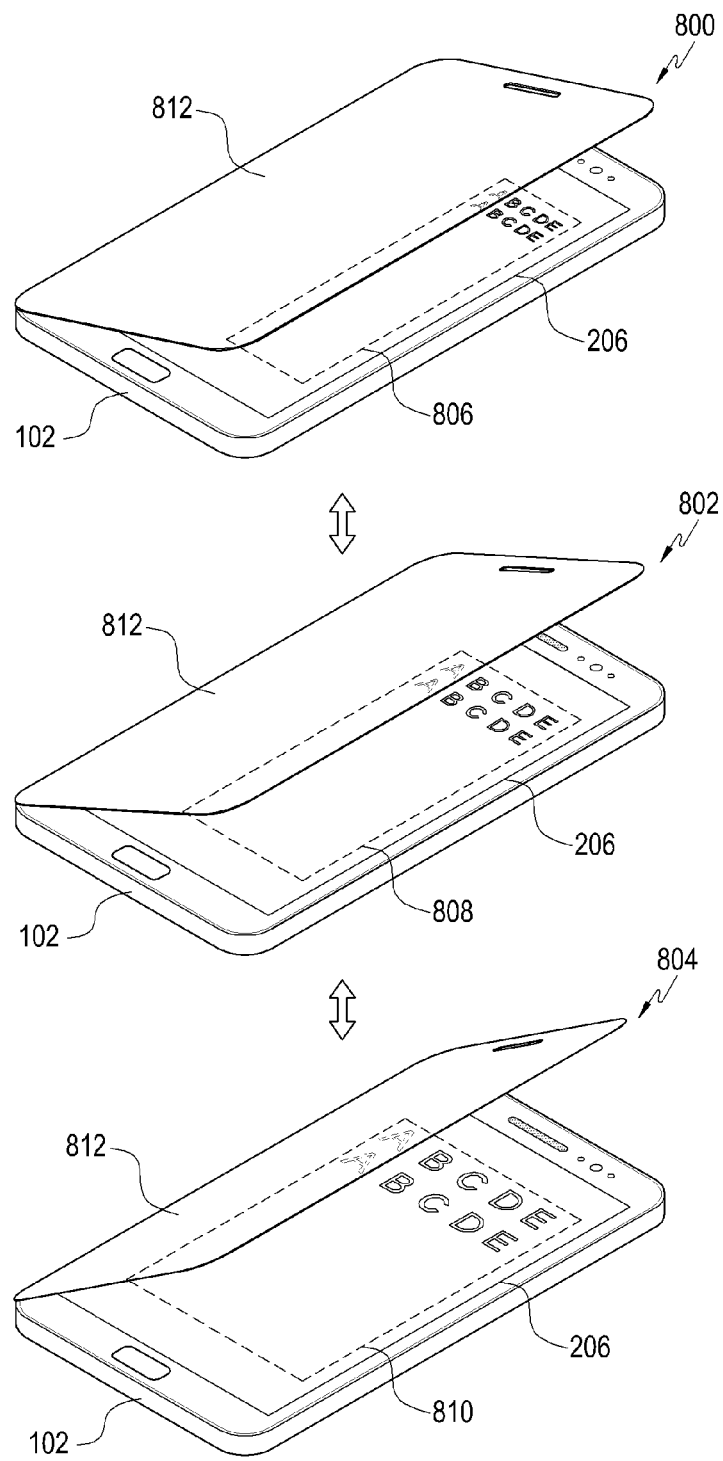
FIG. 8 illustrates an example of displaying according to opening and closing of a cover according to an embodiment of the present disclosure.

FIG. 8 illustrates an example of displaying according to opening and closing of a cover according to an embodiment of the present disclosure.

Referring to FIG. 8, an electronic device 102 adopting a cover 812 not having a window is shown. In the illustrated embodiment, the size of a partial screen is changed according to the degree of opening of the cover 812. FIG. 8 illustrates three examples 800, 802 and 804 in which the size of a partial screen is changed according to the degree of opening of the cover 812.

The partial screens 806, 808 and 810 of the three examples 800, 802 and 804 in FIG. 8 may be changed in sizes according to the degree of opening of the cover 812. The electronic device 102 may change the size of the partial screen according to the degree of opening of the cover 812. As the degree of opening gradually increases from the example 800, to the example 802, then to the example 804, the electronic device 102 may change the size of the partial screen to gradually increase from the small partial screen 806, to the medium partial screen 808, then to the big partial screen 810. As the degree of opening gradually decreases from the example 804, to the example 802, then to the example 800, the electronic device 102 may change the size of the partial screen to gradually decrease from the big partial screen 810, to the medium partial screen 808, then to the small partial screen 806. In the illustrated example of FIG. 8, the size of the partial screen is increased by means of increasing a width of the screen while the length of the screen stays substantially the same. Also, as the width of the partial screen is increased, a size of texts displayed on the partial screen is increased. In another example, the length of the partial screen may be increased while the width remains the same. In another example, both the width and the length of the partial screen may be increased. In another example, the size of the text may increase while the length and width of the partial screen remains the same.

The partial screens 806, 808 and 810 may be displayed at the position where a user can easily view the contents of the partial screen in the screen 206 of the display 150. For example, the partial screens may be displayed in the screen area relatively far from the pivot axis of the cover 812. The size of the partial screens 806, 808 and 810 may be changed to increase or decrease in the direction of the pivot axis of the cover 812. The position of the partial screens 806, 808 and 810 may be specified automatically or manually.

Figure 9:
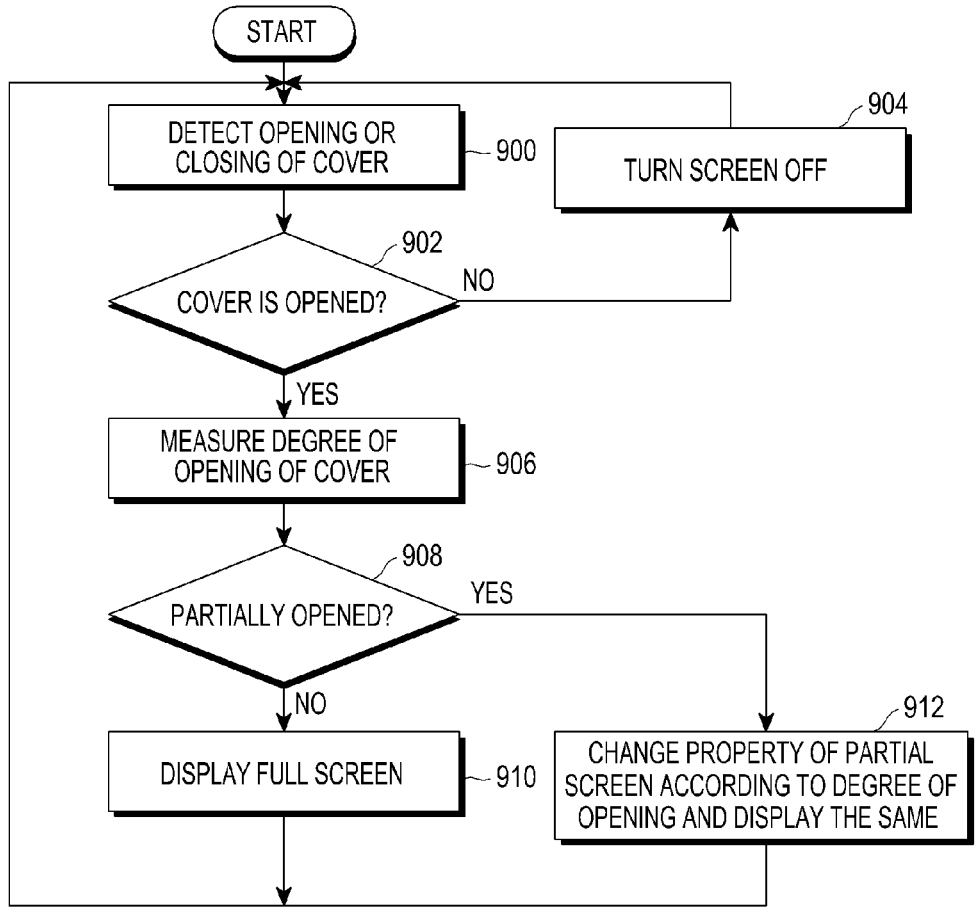
FIG. 9 is a flowchart of displaying according to an embodiment of the present disclosure.

FIG. 9 is a flowchart of displaying according to an embodiment of the present disclosure. FIG. 9 refers to an electronic device 102 that adopts a cover 812 not having a window. Operations of FIG. 9 may be executed by, for example, a controller of the electronic device 102.

Referring to FIG. 9, the electronic device 102 may detect opening or closing of the cover 812 by means of the opening/closing sensor 171 in operation 900 to thereby determine whether the cover 812 is opened in operation 902. When the cover 812 is closed, the electronic device 102 may turn the screen off in operation 904. After operation 904, the electronic device 102 may repeat operation 900.

When the cover 812 is opened, the electronic device 102 may operate and allow the distance sensor 172 to measure the degree of opening of the cover 812 in operation 906. As described above, the electronic device 102 may determine whether the degree of opening is in the range of partial opening to thereby determine whether the cover 812 is partially opened in operation 908.

When the cover 812 is fully opened, the electronic device 102 may display a full screen by which contents may be displayed on the entire screen 206 of the display 150 as shown in FIG. 2A in operation 910. After operation 910, the electronic device 102 may repeat operation 900.

When the cover 812 is partially opened, the electronic device 102 may change the property of a partial screen to thereby display the same on the screen 206 of the display 150 according to the degree of opening of the cover 812 in operation 912. The electronic device 102 that changes the property of a partial screen in operation 912, for example, may change the size of partial screen, for example, as the sizes of partial screens 806, 808 and 810 according to the degree of opening of the cover 812 as shown in FIG. 8. After operation 912, the electronic device 102 may repeat operation 900.

Accordingly, a partial screen may be displayed in a big size as far as possible in the area where a user may easily view the partial screen, other than the area close to the pivot axis of the cover 812 where it is hard for a user to view the partial screen, according to the degree of opening of the cover 812, so the user may easily view the contents displayed on the partial screen. In addition, the contents displayed on the partial screen may be prevented from being exposed to other people by the partially opened cover 812.

As the embodiment described in FIG. 5, in the embodiments of FIGS. 8 and 9, a configuration of contents may be changed to be thereby displayed on the partial screen according to partial opening of the cover 812, so that the readability with respect to the contents displayed on the partial screen may be enhanced.

According to another embodiment of the present disclosure, the size of the partial screen may be changed by a user, for example, as the sizes of the partial screens 806, 808 and 810. For example, a user may touch the partial screens 806, 808 and 810 on the screen 206 to thereby enlarge or contract the partial screens 806, 808 and 810.

A displaying method of an electronic device according to various embodiments of the present disclosure may include detecting opening or closing of a cover, when opening of the cover is detected, determining whether the cover is partially opened by measuring the degree of opening of the cover, and when the degree of opening is determined to be partial opening, displaying a partial screen at a specified position in the screen. The operation of determining whether the cover is partially opened by measuring the degree of opening of the cover may include determining whether the degree of opening is in a specified range of partial opening, and when the degree of opening is in the specified range of partial opening, determining that the cover is partially opened. The specified position may be designated in a second screen area other than a first screen area that corresponds to a window formed in a portion of the cover in the whole screen area. A displaying method according to various embodiments of the present disclosure may further include, when closing of the cover is detected, displaying the partial screen in the first screen area, and when it is detected that the cover is partially opened in a closed state, stopping displaying the partial screen in the first screen area. The operation of displaying a partial screen at a specified position may include changing the property of the partial screen displayed at the specified position according to the degree of opening. The operation of changing the property of the partial screen according to the degree of opening may include changing the size of the partial screen in the direction of the pivot axis of the cover. The operation of determining whether the cover is partially opened by measuring the degree of opening of the cover may include regarding a distance between a facing surface of the cover and the screen, which are measured by a distance sensor, as the degree of opening. The operation of determining whether the cover is partially opened by measuring the degree of opening of the cover may include operating the distance sensor while opening of the cover is being detected. The operation of displaying a partial screen at a specified position may include, when contents to be displayed on the partial screen have images and texts, removing the images from the contents and displaying the image-removed contents on the partial screen. The operation of displaying a partial screen at a specified position may include measuring the illuminance around the electronic device, and when the illuminance around the electronic device is less than a reference value, and the contents to be displayed on the partial screen have images and texts, removing the images form the contents and displaying the image-removed contents on the partial screen.

Figure 10:
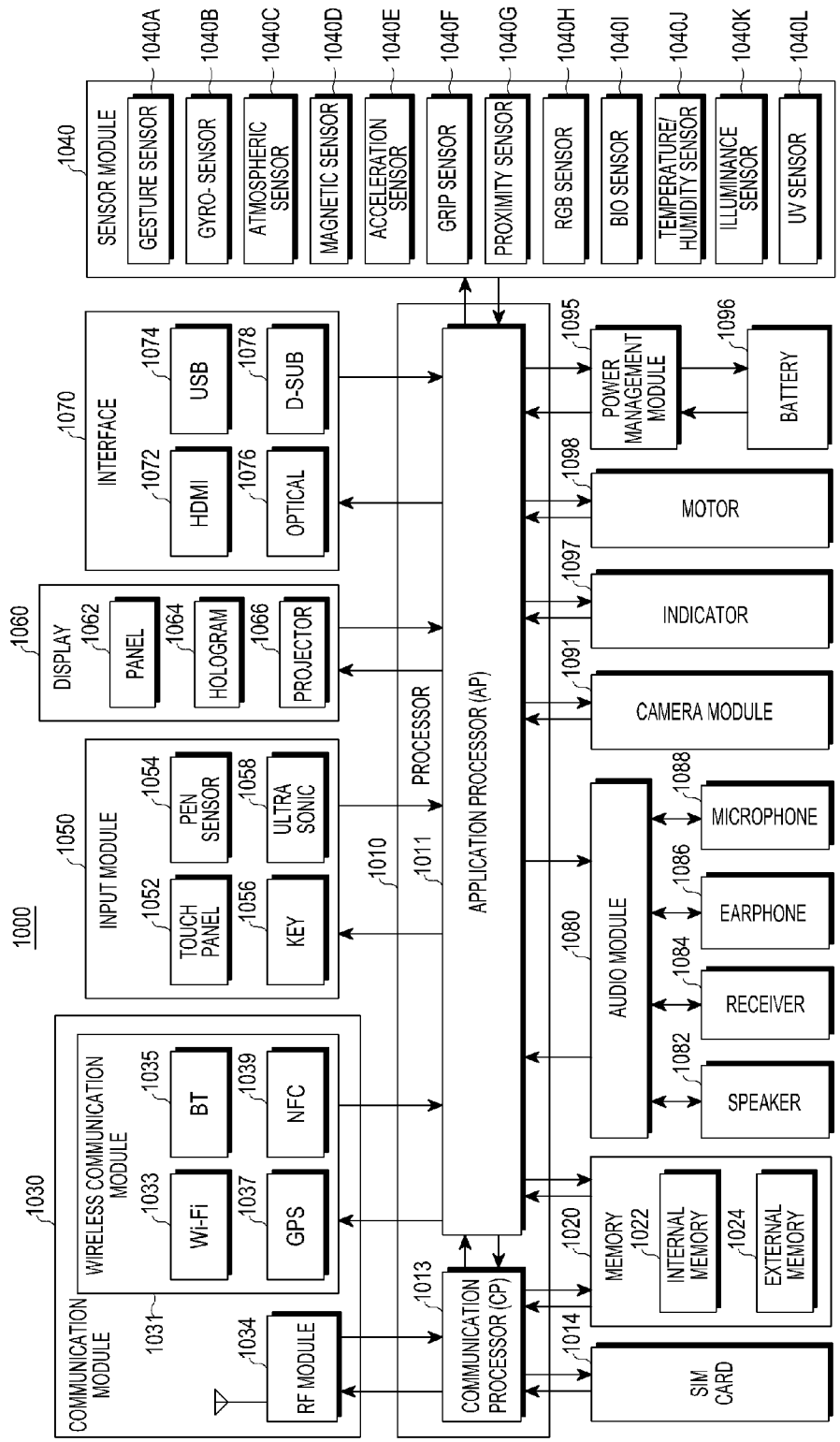
FIG. 10 illustrates a structure of an electronic device according to various embodiments of the present disclosure.

FIG. 10 illustrates a configuration of an electronic device according to various embodiments of the present disclosure. The electronic device of FIG. 10 may constitute a part or all of, for example, the electronic device 102 shown in FIG. 1.

Referring to FIG. 10, the electronic device 1000 may include at least one processor 1010, a Subscriber Identification Module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, or a motor 1098.

The processor 1010 may include at least one Application Processor (AP) 1011 or at least one Communication Processor (CP) 1013. The processor 1010 may be the processor 120 shown in FIG. 1. Although the AP 1011 and the CP 1013 are included in the processor 1010 in FIG. 10, the AP 1011 and the CP 1013 may be included in different IC packages. Alternatively, according to another embodiment of the present disclosure, the AP 1011 and the CP 1013 may be included in a single IC package.

The AP 1011 may control a multitude of hardware or software elements perform processing of various data including multimedia data and calculation by executing an operating system or application programs. The AP 1011 may be implemented with, for example, a System on Chip (SoC). According to an embodiment, the AP 1011 may further include a Graphic Processing Unit (GPU) (not shown).

The CP 1013 may manage data links and transform communication protocols in communication between electronic devices connected with the electronic device 1000 through networks. The CP 1013 may be implemented by, for example, the SoC. According to an embodiment of the present disclosure, the CP 1013 may perform at least a part of a multimedia control function. For example, the CP 1013 may perform identification and authentication of electronic devices 1000 in a communication network using a subscriber identification module (e.g., the SIM card 1014). Further, the CP 1013 may provide services such as voice calls, video calls, text messaging, packet data, or the like to a user.

In addition, the CP 1013 may control transmission and reception of data of the communication module 1030. Although elements such as the CP 1013, the power management module 1095 or the memory 1020 are separately provided from the AP 1011 in FIG. 10, the AP 1011 may include at least one (e.g., the CP 1013) of the above-described elements according to another embodiment of the present disclosure.

According to an embodiment of the present disclosure, the AP 1011 or the CP 1013 may load instructions or data received from at least one of non-volatile memories or other elements which are connected with the AP 1011 and the CP 1013 to volatile memories and process the same. Further, the AP 1011 or CP 1013 may store data that is received or generated from or by at least one of the elements in non-volatile memories.

The SIM card 1014 may be a card adopting a subscriber identification module, and be inserted into a slot formed at a specified position of the electronic device 1000. The SIM card 1014 may include inherent identification information {e.g., an Integrated Circuit Card IDentifier (ICCID)} or subscriber information {e.g., an International Mobile Subscriber Identity (IMSI)}.

The memory 1020 may include an internal memory 1022 or an external memory 1024. The memory 1020 may be, for example, the memory 130 shown in FIG. 1. The internal memory 1022 may include at least one of a volatile memory {e.g., a Dynamic RAM (DRAM), a Static RAM (SRAM), a Synchronous Dynamic RAM (SDRAM), or the like} or a non-volatile Memory {e.g., an One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like}. According to an embodiment of the present disclosure, the internal memory 1022 may be a Solid-State Drive (SSD). The external memory 1024 may include a flash drive, for example, a Compact Flash (CF), a Secure Digital (SD), a Micro Secure Digital (Micro-SD), a Mini Secure Digital (Mini-SD), an extreme Digital (xD), a Memory Stick, or the like. The external memory 1024 may be functionally connected with the electronic device 1000 through various interfaces.

Although not shown, the electronic device 1000 may further include a storage device (or a storage medium) such as a hard drive.

The communication module 1030 may include a wireless communication module 1031 or a Radio Frequency (RF) module 1034. The communication module 1030 may be, for example, the communication interface 160 shown in FIG. 1. The wireless communication module 1031 may include a Wi-Fi module 1033, a BlueTooth (BT) module 1035, a Global Positioning System (GPS) module 1037, or a Near Field Communication (NFC) module 1039. For example, the wireless communication module 1031 may provide a wireless communication function by using a wireless frequency. Additionally or selectively, the wireless communication module 1031 may include a network interface (e.g., a LAN card) or a modem for connecting the electronic device 1000 with networks {e.g., the Internet, a Local Area Network (LAN), a Wide Area Network (WAN), a telecommunication network, a cellular network, a satellite network, a POTS, or the like}.

The RF module 1034 may transmit and receive voice or data signals. The RF module 1034, although not shown, may include, for example, transceivers, Power Amp Modules (PAMs), frequency filters, Low Noise Amplifiers (LNA), or the like. Further, the RF module 1034 may further include components, for example, conductors or cables for transmitting and receiving electromagnetic waves through a free space in wireless communication.

The sensor module 1040 may include at least one of, for example, a gesture sensor 1040A, a gyro-sensor 1040B, an atmospheric sensor 1040C, a magnetic sensor 1040D, an acceleration sensor 1040E, a grip sensor 1040F, a proximity sensor 1040G, a Red-Green-Blue (RGB) sensor 1040H, a bio sensor 1040I, a temperature/humidity sensor 1040J, an illuminance sensor 1040K, an Ultra Violet (UV) sensor 1040L, or an InfRared (IR) sensor (not shown). The sensor module 1040 may measure physical quantities and detect an operation state of the electronic device, to thereby convert the measured or detected information to electric signals. Alternatively or additionally, the sensor module 1040 may further include an E-nose sensor (not shown), an Electro-MyoGraphy sensor (EMG) (not shown), an ElectroEncephaloGram sensor (EEG) (not shown), an ElectroCardioGram sensor (ECG) (not shown), a fingerprint sensor, or the like. The sensor module 1040 may further include a control circuit for controlling at least one sensor included in the sensor module 1040.

The input module 1050 may include a touch panel 1052, a (digital) pen sensor 1054, keys 1056, or an ultrasonic input device 1058. The input module 1050 may be included in, for example, the input/output interface 140 shown in FIG. 1. The touch panel 1052 may recognize a touch input by at least one of, for example, a capacitive type, a pressure type, an infrared type, or an ultrasonic type. In addition, the touch panel 1052 may further include a controller (not shown). In a case of a capacitive type, the proximity as well as physical touches may be detected. The touch panel 1052 may further include a tactile layer function. In this case, the touch panel 1052 may provide a user with a tactile reaction.

The (digital) pen sensor 1054 may be implemented by using, for example, a method that is the same as or similar to a user's touch input, or a separate recognition sheet. The keys 1056 may include, for example, physical buttons, optical keys, keypads, or touch keys. The ultrasonic input device 1058 detects acoustic waves with a microphone (e.g., a microphone 1088) at the terminal through an input means that generates ultrasonic signals to thereby identify data. The ultrasonic input device 1058 may perform wireless recognition. According to an embodiment, the electronic device 1000 may receive a user input from external devices (e.g., networks, computers, or servers) which are connected with the communication module 1030 by using the communication module 1030.

The display 1060 may include a panel 1062, a hologram device 1064, or a projector 1066. The display 1060 may be, for example, the display 150 shown in FIG. 1. The panel 1062 may be, for example, a Liquid Crystal Display (LCD), an Active-Matrix Organic Light-Emitting Diode (AMOLED), or the like. The panel 1062 may be implemented to be, for example, flexible, transparent or wearable. The panel 1062 may be configured with the touch panel 1052 as a single module. The hologram device 1064 may display 3D images in the air by using interference of light. The projector 1066 may display images by projecting light onto a screen. According to an embodiment, the display 1060 may further include a control circuit for controlling the panel 1062, the hologram device 1064, or the projector 1066.

The interface 1070 may include, for example, a High-Definition Multimedia Interface (HDMI) 1072, a Universal Serial Bus (USB) 1074, an optical interface 1076, or a D-subminiature (D-sub) 1078. The interface 1070 may be included in, for example, the communication interface 160 shown in FIG. 1. Additionally or alternatively, the interface 1070 may include, for example, a Secure Digital (SD)/Multi-Media Card (MMC), or an Infrared Data Association (IrDA).

The audio module 1080 may convert voices to electric signals, and vice versa. The audio module 1080 may be included, for example, in the input/output interface 140 shown in FIG. 1. The audio module 1080 may process voice information input or output through, for example, a speaker 1082, a receiver 1084, an earphone 1086 or the microphone 1088.

The camera module 1091 is a device for photographing still and moving images, and may include at least one image sensor (e.g., a front sensor or a rear sensor), lenses (not shown), an Image Signal Processor (ISP) (not shown), or a flash (not shown) (e.g., LED or a xenon lamp) according to an embodiment of the present disclosure.

The power management module 1095 may manage power of the electronic device 1000. Although not shown, the power management module 1095 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be divided into a wired type and a wireless type. The charger IC may charge a battery and prevent inflow of excessive voltage or excessive current from a charger. According to an embodiment of the present disclosure, the charger IC may include a charger IC for at least one of the wired charging type or the wireless charging type. The wireless charging type may encompass, for example, a magnetic resonance type, a magnetic induction type or an electromagnetic wave type, and additional circuits for wireless charging, for example, coil loops, resonance circuits, rectifiers, or the like may be added.

A battery gauge may measure, for example, the capacity of battery 1096, a charging voltage and current, a temperature, or the like. The battery 1096 may store or supply electric power to the electronic device 1000. The battery 1096 may be, for example, a rechargeable battery or a solar battery.

The indicator 1097 may display a specific state, for example, a booting state, a message state or a charging state of the whole or a part (e.g., the AP 1011) of the electronic device 1000. The motor 1098 may convert electric signals to a mechanical vibration.

Although not shown, the electronic device 1000 may include a processing device (e.g., the GPU) for supporting a mobile TV. The processing device for supporting a mobile TV may process media data according to standards such as, for example, a Digital Multimedia Broadcasting (DMB), a Digital Video Broadcasting (DVB) or a media flow.

Each of the above-described elements of the electronic device according to various embodiments of the present disclosure may be configured with one or more components, and the names of the corresponding elements may depend on the type of electronic device. The electronic device according to various embodiments of the present disclosure may be configured by including at least one of the above-described elements, and some of the elements may be omitted, or other elements may be added. In addition, some of the elements of the electronic device according to various embodiments of the present disclosure may be combined to a single entity that can perform the same functions as those of original elements.

The term "module" used in various embodiments of the present disclosure may mean a unit including one or more combinations of, for example, hardware, software or firmware. The "module" may be replaced with terms such as, for example, a unit, a logic, a logical block, a component, or a circuit. The "module" may be a minimum unit or a part of components which are integrally formed. The "module" may be a minimum unit or a part thereof which perform one or more functions. The "module" may be implemented mechanically or electronically. For example, the "module" may include at least one of Application-Specific Integrated Circuit (ASIC) chips, Field-Programmable Gate Arrays (FPGAs), or programmable-logic devices, which are well-known or will be developed in the future for performing specified operations.

According to various embodiments of the present disclosure, at least some of devices (e.g., modules or functions thereof) or methods (e.g., operations) according to various embodiments of the present disclosure may be implemented with instructions stored in computer-readable storage media, for example, as a form of programming module. When the instructions are performed by at least one processor (e.g., the processor 120), the at least one processor may perform functions corresponding to the instructions. The computer-readable storage medium may be, for example, the memory 130. At least some of the programming modules may be implemented (e.g., performed) by, for example, the processor 120. At least some of the programming modules may include, for example, modules, programs, routines, sets of instructions and/or processes for performing at least one function.

The computer-readable recording medium includes magnetic media such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are specially configured to store and perform program instructions. Further, the program instruction includes a machine language code generated by a compiler and a high-level language code executable by a computer through an interpreter and the like. The hardware devices may be configured to operate as one or more software modules to perform the operations of the present disclosure, and vice versa.

The electronic device according to embodiments of the present disclosure may receive and store programs including instructions to allow the electronic device to perform a displaying method from program providing devices which are connected by a wire or wirelessly, and the electronic device or the servers shown in FIG. 1 may be the program providing devices. The program providing devices may include a memory for storing programs, a communication module for performing wireless or wired communication with the electronic device, and a processor for transmitting programs automatically or by a request of the electronic device.

The module or the programming module according to various embodiments of the present disclosure may include one or more of the aforementioned components, or some of the components may be omitted or other additional components may be further included. Operations performed by the modules according to various embodiments of the present disclosure, the programming modules or other elements may be processed sequentially, concurrently, repeatedly or heuristically. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A displaying method of an electronic device using a cover, the method comprising:
    detecting opening or closing of the cover on a first screen of a display, the cover including a transparent window and a non-transparent portion;
    displaying a first partial screen on a first screen area in the first screen when a closing of the cover is detected;
    determining whether the cover is partially opened by measuring a degree of opening of the cover when opening of the cover is detected; and
    in response to determining the cover to be partially opened, stopping the displaying of the first partial screen on the first screen area and displaying a second partial screen at a specified position designated in a second screen area in the first screen other than the first screen area,
    wherein the first screen area is exposed through the transparent window of the cover and the second screen area is covered by the non-transparent portion of the cover, when the cover is closed on the first screen, and
    wherein the cover is a non-segmented cover.

2. The method of claim 1, wherein the determining of whether the cover is partially opened by measuring the degree of opening of the cover comprises:
    determining whether the degree opening is in a specified range of partial opening; and
    determining that the cover is partially opened when the degree of opening is in the specified range of partial opening.

3. The method of claim 1, wherein the displaying of the second partial screen at a specified position comprises changing a property of the second partial screen displayed at the specified position according to the degree of opening.

4. The method of claim 1, wherein the determining of whether the cover is partially opened by measuring the degree of opening of the cover comprises determining a distance between a facing surface of the cover and the first screen, which are measured by a distance sensor, as the degree of opening.

5. The method of claim 4, wherein the determining of whether the cover is partially opened by measuring the degree of opening of the cover comprises operating the distance sensor while opening of the cover is being detected.

6. The method of claim 1, wherein the displaying of the second partial screen at a specified position comprises, removing images from contents to be displayed on the second partial screen and displaying the image-removed contents on the second partial screen when the contents to be displayed on the second partial screen have images and texts.

7. An electronic device using a cover comprising:
    a display configured to include a first screen on which the cover is opened or closed, the cover including a transparent window and a non-transparent portion;
    a sensor module configured to:
        doted an opening or a closing of the cover on the first screen, and
        measure a degree of the opening of the cover; and
    a processor configured to:
        display a first partial screen on a first screen area in the first screen when a closing of the cover is detected, and
        in response to determining the cover to be partially opened, stop the displaying of the first partial screen on the first screen area and display a second partial screen at a specified position designated in a second screen area in the first screen other than the first screen area, wherein the first screen area is exposed through the transparent window of the cover and the second screen area is covered by the non-transparent portion of the cover, when the cover is closed on the first screen, and wherein the cover is a non-segmented cover.

8. The electronic device of claim 7, wherein the processor is configured to determine that the cover is partially opened when the degree of opening is in a specified range of partial opening.

9. The electronic device of claim 7, wherein the processor is configured to change a property of the second partial screen displayed at the specified position according to the degree of opening.

10. The electronic device of claim 7, wherein the sensor module includes a distance sensor configured to measure a distance between a facing surface of the cover and the first screen, and the processor is configured to determine the distance measured by the distance sensor as the degree of opening.

11. The electronic device of claim 10, wherein the sensor module includes an opening closing sensor configured to detect opening and closing of the cover, and the processor is configured to operate the distance sensor while opening of the cover is being detected by the opening/closing sensor.

12. The electronic device of claim 7, wherein the processor is configured to remove images from contents to be displayed on the second partial screen and display the image-removed contents on the second partial screen when the contents to be displayed on the second partial screen have images and texts.

* * * * *